(12) United States Patent
Stephenson

(10) Patent No.: US 6,453,428 B1
(45) Date of Patent: Sep. 17, 2002

(54) DUAL-DRIVE FAULT TOLERANT METHOD AND SYSTEM FOR ASSIGNING DATA CHUNKS TO COLUMN PARITY SETS

(75) Inventor: Dale J. Stephenson, Tracy, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/354,426

(22) Filed: Jul. 16, 1999

Related U.S. Application Data

(60) Provisional application No. 60/093,281, filed on Jul. 17, 1998.

(51) Int. Cl.$^7$ .................................................. H02H 3/05
(52) U.S. Cl. ............................. 714/6; 714/770; 711/114
(58) Field of Search .................................. 714/6, 5, 7, 9, 714/42, 766, 770, 801, 804; 711/114, 113, 112, 134, 156, 4; 707/206; 710/52

(56) References Cited

U.S. PATENT DOCUMENTS

| | | | | |
|---|---|---|---|---|
| 5,258,984 A | * | 11/1993 | Menon et al. | 714/7 |
| 5,331,646 A | * | 7/1994 | Krueger et al. | 714/766 |
| 5,499,253 A | * | 3/1996 | Lary | 714/770 |
| 6,000,010 A | * | 12/1999 | Legg | 711/114 |

* cited by examiner

Primary Examiner—Robert Beausoleil
Assistant Examiner—Rita Ziemer

(74) Attorney, Agent, or Firm—Martine & Penilla, LLP

(57) ABSTRACT

The present invention provides a method and system for assigning data chunks to column parity sets in a dual-drive fault tolerant storage disk drive system having N disk drives, where N is a prime number. Each of the N disk drives are organized into N chunks such that the N disk drives are configured as one or more N×N array of chunks. The array has chunks arranged in N rows from row 1 to row N and in N columns from column 1 to column N. Each row includes a plurality of data chunks for storing data, a column parity chunk for storing a column parity set, and a row parity chunk for storing a row parity set. These data chunks are assigned in a predetermined order. The data chunks in each row are assigned to the row parity set. Each column parity set is associated with a set of data chunks in the array, wherein row m is associated with column parity set $Q_m$ where m is an integer that ranges from 1 to N. For row 1 of a selected N×N array, a first data chunk is assigned to a column parity set $Q_i$ wherein i is an integer determined by rounding down (N/2). For each of the remaining data chunks in row 1, each data chunk is assigned to a column parity set $Q_j$, wherein j is an integer one less than the column parity set for the preceding data chunk and wherein j wraps to N when j is equal to 0. For each of the remaining rows 2 to N of the selected array, a first logical data chunk is assigned to a column parity set $Q_k$, wherein k is one greater than the column parity set for the first logical data chunk in a preceding row and wherein k wraps to 1 when k is equal to (N+1). For each of the remaining data chunks in rows 2 to N, each data chunk is assigned to a column parity set $Q_n$, wherein n is an integer one less than a column parity set for the preceding data chunk and wherein n wraps to N when n is equal to 0.

20 Claims, 8 Drawing Sheets

|       | Col. 1 | Col. 2 | Col. 3 | Col. 4 | Col. 5 | Col. 6 | Col. 7 |
|-------|--------|--------|--------|--------|--------|--------|--------|
| Row 1 | A3     | A2     | A1     | A7     | A6     | (1)    | (A)    |
| Row 2 | B2     | B1     | B7     | (2)    | (B)    | B4     | B3     |
| Row 3 | C1     | (3)    | (C)    | C5     | C4     | C3     | C2     |
| Row 4 | (D)    | D6     | D5     | D4     | D3     | D2     | (4)    |
| Row 5 | E6     | E5     | E4     | E3     | (5)    | (E)    | E7     |
| Row 6 | F5     | F4     | (6)    | (F)    | F1     | F7     | F6     |
| Row 7 | (7)    | (G)    | G2     | G1     | G7     | G6     | G5     |

|  | Col. 1 | Col. 2 | Col. 3 | Col. 4 | Col. 5 | Col. 6 | Col. 7 | Col. 8 | Col. 9 | Col. 10 | Col. 11 |
|---|---|---|---|---|---|---|---|---|---|---|---|
| Row 1 | A5 | A4 | A3 | A2 | A1 | A11 | A10 | A9 | A8 | (1) | (A) |
| Row 2 | B4 | B3 | B2 | B1 | B11 | B10 | B9 | (2) | (B) | B6 | B5 |
| Row 3 | C3 | C2 | C1 | C11 | C10 | (3) | (C) | C7 | C6 | C5 | C4 |
| Row 4 | D2 | D1 | D11 | (4) | (D) | D8 | D7 | D6 | D5 | D4 | D3 |
| Row 5 | E1 | (5) | (E) | E9 | E8 | E7 | E6 | E5 | E4 | E3 | E2 |
| Row 6 | (F) | F10 | F9 | F8 | F7 | F6 | F5 | F4 | F3 | F2 | (6) |
| Row 7 | G10 | G9 | G8 | G7 | G6 | G5 | G4 | G3 | (7) | (G) | G11 |
| Row 8 | H9 | H8 | H7 | H6 | H5 | H4 | (8) | (H) | H1 | H11 | H10 |
| Row 9 | I8 | I7 | I6 | I5 | (9) | (I) | I2 | I1 | I11 | I10 | I9 |
| Row 10 | J7 | J6 | (10) | (J) | J3 | J2 | J1 | J11 | J10 | J9 | J8 |
| Row 11 | (11) | (K) | K4 | K3 | K2 | K1 | K11 | K10 | K9 | K8 | K7 |

FIG. 7

|  | Col. 1 | Col. 2 | Col. 3 | Col. 4 | Col. 5 | Col. 6 | Col. 7 | Col. 8 | Col. 9 | Col. 10 | Col. 11 | Col. 12 | Col. 13 |
|---|---|---|---|---|---|---|---|---|---|---|---|---|---|
| Row 1 | A6 | A5 | A4 | A3 | A2 | A1 | A13 | A12 | A11 | A10 | A9 | (1) | (A) |
| Row 2 | B5 | B4 | B3 | B2 | B1 | B13 | B12 | B11 | B10 | (2) | (B) | B7 | B6 |
| Row 3 | C4 | C3 | C2 | C1 | C13 | C12 | C11 | (3) | (C) | C8 | C7 | C6 | C5 |
| Row 4 | D3 | D2 | D1 | D13 | D12 | (4) | (D) | D9 | D8 | D7 | D6 | D5 | D4 |
| Row 5 | E2 | E1 | E13 | (5) | (E) | E10 | E9 | E8 | E7 | E6 | E5 | E4 | E3 |
| Row 6 | F1 | (6) | (F) | F11 | F10 | F9 | F8 | F7 | F6 | F5 | F4 | F3 | F2 |
| Row 7 | (G) | G12 | G11 | G10 | G9 | G8 | G7 | G6 | G5 | G4 | G3 | G2 | (7) |
| Row 8 | H12 | H11 | H10 | H9 | H8 | H7 | H6 | H5 | H4 | H3 | (8) | (H) | H13 |
| Row 9 | I11 | I10 | I9 | I8 | I7 | I6 | I5 | I4 | (9) | (I) | I1 | I13 | I12 |
| Row 10 | J10 | J9 | J8 | J7 | J6 | J5 | (10) | (J) | J2 | J1 | J13 | J12 | J11 |
| Row 11 | K9 | K8 | K7 | K6 | (11) | (K) | K3 | K2 | K1 | K13 | K12 | K11 | K10 |
| Row 12 | L8 | L7 | (12) | (L) | L4 | L3 | L2 | L1 | L13 | L12 | L11 | L10 | L9 |
| Row 13 | (13) | (M) | M5 | M4 | M3 | M2 | M1 | M13 | M12 | M11 | M10 | M9 | M8 |

FIG. 8

DUAL-DRIVE FAULT TOLERANT METHOD AND SYSTEM FOR ASSIGNING DATA CHUNKS TO COLUMN PARITY SETS

CROSS REFERENCE TO RELATED APPLICATIONS

The present application claims priority benefit of U.S. Provisional Application No. 60/093,281, filed on Jul. 17, 1998. The present application is also related to U.S. pat. application Ser. No. 09/250,657 entitled "RAID Architecture with Two-drive Fault Tolerance," filed on Feb. 16, 1999. The disclosures of these applications are incorporated herein by reference.

BACKGROUND OF THE INVENTION

1. Field of the Invention

The disclosed invention relates to architectures for arrays of disk drives, and more particularly, to disk array architectures that provide two-drive fault tolerance.

2. Description of the Related Art

Since the beginning of computers, data protection has been one of the main concerns in designing data storage systems. Valuable data stored in hard drives can be lost due to abnormal occurrences such as human errors, equipment failures, and adverse environmental conditions. With the advent of on-line, interactive computing, the protection of data against failure has become an even more important consideration in designing data storage systems. For example, modem e-commerce enables companies to conduct all or sizable portion of their business over the Internet using computers. In such scenario, if hard drives on a company's server computer fail, the company's business may come to a standstill. This may lead to a substantial loss in business and goodwill of its customers.

To guard against such disastrous events and enhance I/O performance, many computer systems implement a Redundant Array of Independent Disk (RAID) system, which is a disk system that includes a collection of multiple disk drives and an array controller. The disk drives are organized into a disk array and managed by the common array controller. The array controller presents the array to the user as one or more virtual disks. Disk arrays are the framework to which RAID functionality is added in functional levels to produce cost-effective, highly available, high-performance disk systems.

In RAID systems, the data are distributed over multiple disk drives to allow parallel operation, thereby enhancing disk access performance and providing fault tolerance against drive failures. Currently, a variety of RAID levels from RAID level 0 through level 6 has been specified in the industry. For example, RAID level 0 is a performance-oriented striped data mapping technique, Uniformly sized blocks of storage are assigned in a regular sequence to all of the disks in the array. RAID 0 provides high I/O performance at low cost. Reliability of a RAID 0 system is less than that of a single disk drive because failure of any one of the drives in the array can result in a loss of data.

On the other hand, RAID level 1, also called mirroring, provides simplicity and a high level of data availability. A mirrored array includes two or more disks wherein each disk contains an identical image of the data. A RAID level 1 array may use parallel access for high data transfer rates when reading. RAID 1 provides good data reliability and improves performance for read-intensive applications, but at a relatively high cost.

RAID level 2 is a parallel mapping and protection technique that employs error correction codes (ECC) as a correction scheme, but is considered unnecessary because off-the-shelf drives come with ECC data protection. For this reason, RAID 2 has no current practical se, and the same performance can be achieved by RAID 3 at a lower cost. As a result, RAID 2 is rarely used.

RAID level 3 adds redundant information in the form of parity data to a parallel accessed striped array, permitting regeneration and rebuilding of lost data in the event of a single-disk failure. One chunk of parity protects corresponding chunks of data on the remaining disks. RAID 3 provides high data transfer rates and high data availability. Moreover, the cost of RAID 3 is lower than the cost of mirroring since there is less redundancy in the stored data.

RAID level 4 uses parity concentrated on a single disk to allow error correction in the event of a single drive failure (as in RAID 3). Unlike RAID 3, however, member disks in a RAID 4 array are independently accessible. Thus RAID 4 is more suited to transaction processing environments involving short file transfers. RAID 4 and RAID 3 both have a write bottleneck associated with the parity disk, because every write operation modifies the parity disk.

In RAID 5, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) results of all data blocks in the parity disks row. The write bottleneck is reduced because parity write operations are distributed across multiple disks.

As is well known in the art, the RAID levels 1 through 5 provide a single drive fault tolerance. That is, these RAID levels allow reconstruction of the original data if any one of the disk drives fail. Sometimes, however, more than one drive may fail in a RAID system. For example, dual drive failures are becoming more common occurrences as RAID systems incorporate an increasing number of disk drives.

To provide, in part, a dual fault tolerance to such failures, a RAID level 6 has been specified in the industry. The RAID 6 architecture is similar to RAID 5, but RAID 6 can overcome the failure of any two disk drives by using an additional parity block for each row (for a storage loss of 2/N). The first parity block (P) is calculated by performing XOR operation on a set of assigned data chunks. Likewise, the second parity block (Q) is generated by using Reed-Solomon codes on a set of assigned data chunks. When a pair of disk drives fails, the conventional dual-fault tolerant RAID systems reconstruct the data of the failed drives using the parity sets. The RAID systems are well known in the art and are amply described, for example, in *The RAID Book, A storage System Technology Handbook*, by Paul Massiglia, $6^{th}$ Ed. (1997), which is incorporated herein by reference.

Conventional RAID systems implementing the RAID level 6, however, generally require costly and complex array controllers because the Reed-Solomon codes are complex and may require significant computational resources. That is, the complexity of Reed-Solomon codes may preclude the use of such codes in software and necessitate the use of expensive special purpose hardware. Thus, implementation of Reed-Solomon codes in a disk array increases the cost and complexity of the array. Unlike the simpler XOR codes, Reed-Solomon codes cannot easily be distributed among dedicated XOR processors. In a dual XOR RAID scheme described in U.S. patent application Ser. No. 09/250,657, which was previously incorporated by reference, the efficiency of reconstructing the original data depends largely on the scheme used to associate parity sets with data chunks.

Thus, what is needed is a generalized method and system that can efficiently assign column parity sets to data chunks in a dual-drive tolerant RAID system so as to allow efficient reconstruction of the original data in the event of disk drive failures.

SUMMARY OF THE INVENTION

The present invention fills these needs by providing a method and system for assigning column parity sets to data chunks in a dual-fault tolerant RAID system. It should be appreciated that the present invention can be implemented in numerous ways, including as a process, an apparatus, a system, a device, a method, or a computer readable medium. Several inventive embodiments of the present invention are described below.

In one embodiment, the present invention provides a method for assigning data chunks to column parity sets in a dual-drive fault tolerant storage disk drive system having N disk drives, where N is a prime number. In this method, each of the N disk drives are organized into N chunks such that the N disk drives are configured as one or more N×N array of chunks. The array has chunks arranged in N rows from row 1 to row N and in N columns from column 1 to column N. Each row includes a plurality of data chunks for storing data, a column parity chunk for storing a column parity set, and a row parity chunk for storing a row parity set. These data chunks are assigned in a predetermined order. The data chunks in each row are assigned to the row parity set. Each column parity set is associated with a set of data chunks in the array, wherein row m is associated with column parity set $Q_m$ where m is an integer that ranges from 1 to N. For row 1 of a selected N×N array, a first data chunk is assigned to a column parity set $Q_i$, wherein i is an integer determined by rounding down (N/2). For each of the remaining data chunks in row 1, each data chunk is assigned to a column parity set $Q_j$, wherein j is an integer one less than the column parity set for the preceding data chunk and wherein j wraps to N when j is equal to 0. For each of the remaining rows 2 to N of the selected array, a first logical data chunk is assigned to a column parity set $Q_k$ wherein k is one greater than the column parity set for the first logical data chunk in a preceding row and wherein k wraps to 1 when k is equal to (N+1). For each of the remaining data chunks in rows 2 to N, each data chunk is assigned to a column parity set $Q_n$ wherein n is an integer one less than a column parity set for the preceding data chunk and wherein n wraps to N when n is equal to 0.

In another embodiment, the present invention provides a two-drive fault tolerant storage system having a disk array and an array controller. The disk array includes N disk drives where N is a prime number. Each of the disk drives has N chunks such that the N disk drives are configured as an N×N array of chunks. The chunks in the array are arranged in N rows from row 1 to row N and in N columns from column 1 to column N. Each row includes a plurality of data chunks for storing data and a column parity chunk for storing a column parity set. Each row further includes a row parity chunk for storing a row parity set and the data chunks in each row are assigned to the row parity set. Each column parity set is associated with a set of data chunks in the array, wherein row k is associated with column parity set $Q_k$ where k is an integer that ranges from 1 to N. The array controller is operatively coupled to the disk array and is configured to assign a first logical data chunk in row 1 to a column parity set $Q_i$ where i is an integer determined by rounding down (N/2). The array controller is further configured to assign a first logical data chunk in rows 2 to N to a column parity set $Q_j$, wherein j is an integer one greater than the column parity set for the preceding row and wraps to 1 when j is equal to (N+1). The array controller is also configured to assign each of the remaining data chunks to a column parity set $Q_m$ wherein m is an integer one less than a column parity set for the preceding data chunk and wherein m wraps to N when m is equal to 0.

The present invention thus provides an efficient and generalized assignment scheme that can be used for any suitable RAID systems having any prime number of drives. In addition, the association of data parity sets with column parity sets in accordance with the present invention significantly facilitates reconstruction of data in the event of dual-drive failures. This represents the most efficient scheme for reconstructing the original data. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 6 shows an exemplary seven drive configuration generated using the method of FIG. 5.

FIG. 7 illustrates an eleven drive configuration generated in accordance with one embodiment of the present invention.

FIG. 8 shows a thirteen drive RAID configuration generated using the method of FIG. 5.

DETAILED DESCRIPTION OF THE PREFERRED EMBODIMENT

The present invention, a method and system for assigning column parity sets to data chunks in a dual-fault tolerant RAID system, is described. It will be obvious, however, to one skilled in the art, that the present invention may be practiced without some or all of these specific details. In other instances, well known process operations have not been described in detail in order not to unnecessarily obscure the present invention.

Figure 1:
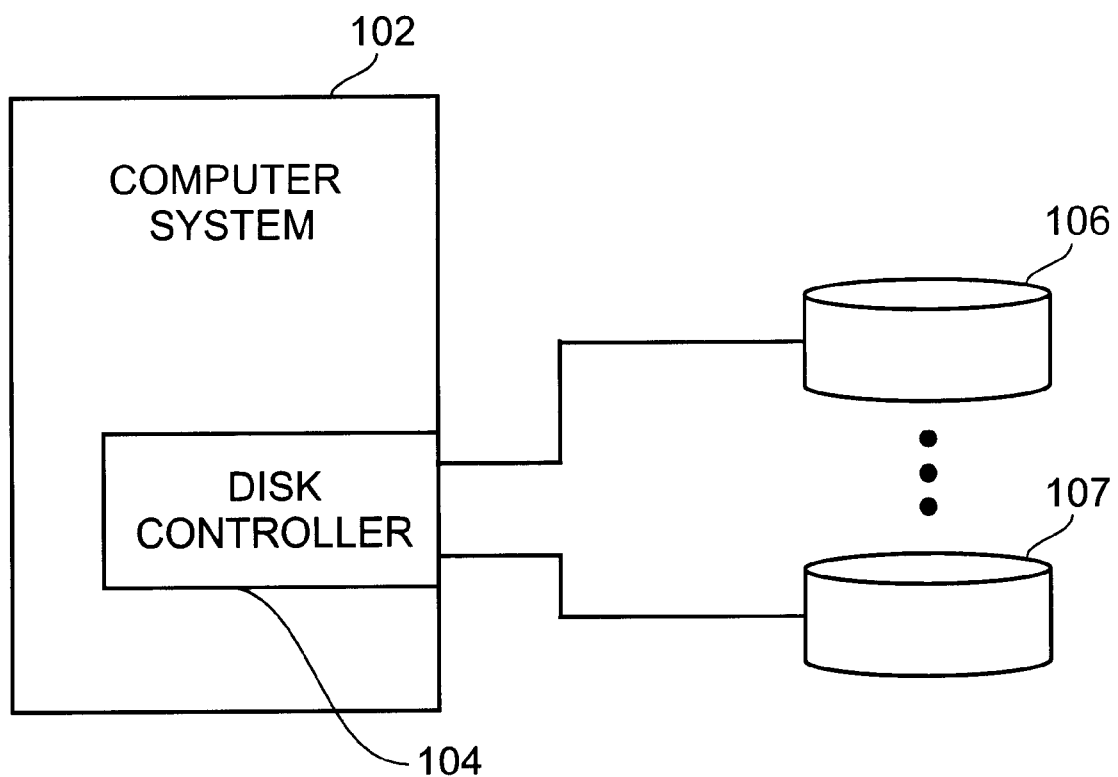
FIG. 1 illustrates a block diagram of one or more disk drives coupled to a computer system.

FIG. 1 illustrates a block diagram showing one or more disk drives coupled to a computer system having a disk controller 104. One or more disk drives 106–107 are coupled to the controller 104. The disk controller 104 together with the disk drives 106–107 define a storage system, preferably a RAID system that implements level 6 RAID standard. Typically, the disk controller communicates with a low level software program, known as a device driver, running on the computer system 102. The device driver controls the operation of the disk controller 104 and directs the controller 104 to read and write data on the disks 106–107. As is well known, there may be more than one disk controller 104 that may either be external to or part of the computer system 102.

Figure 2:
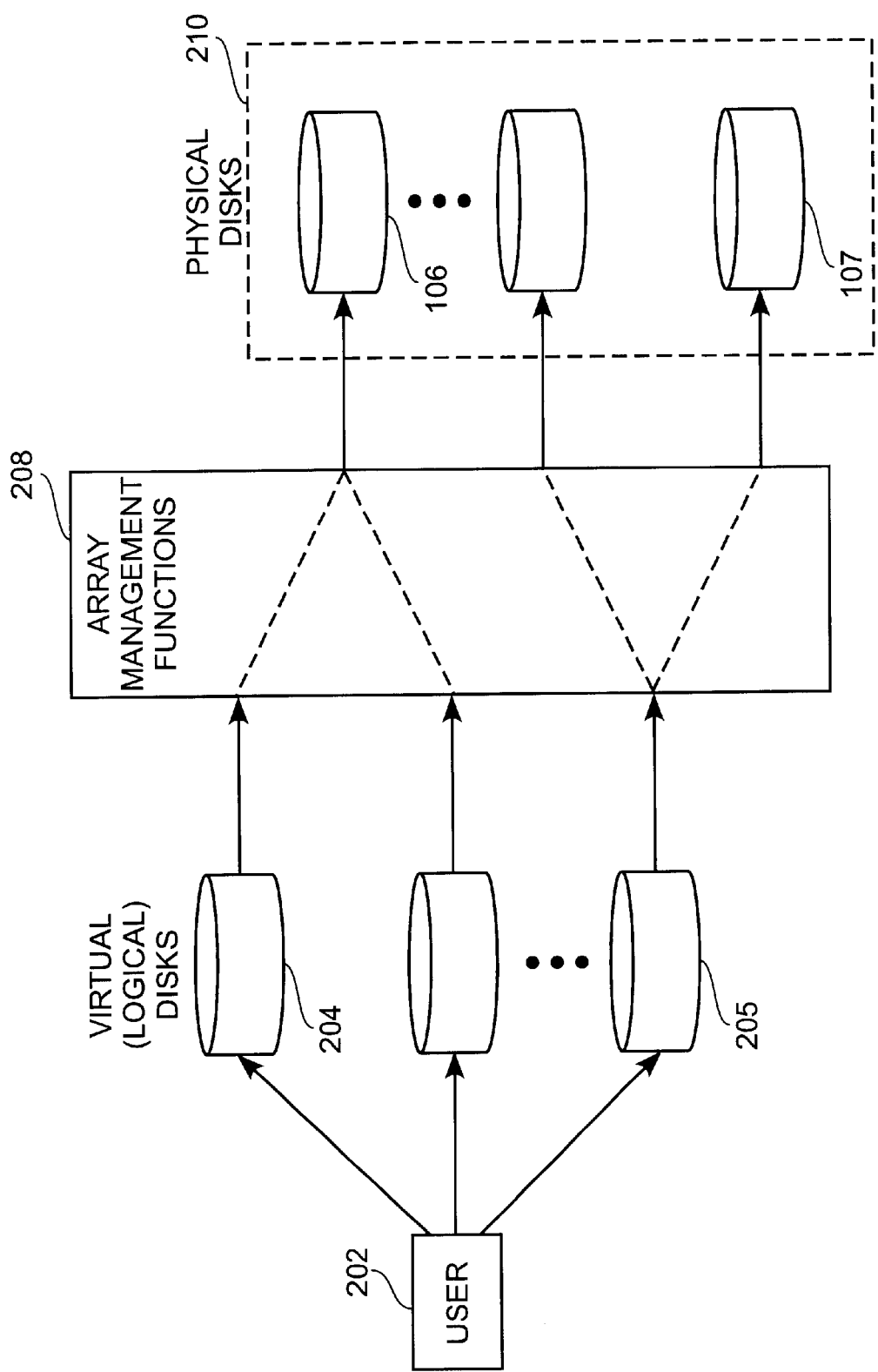
FIG. 2 shows a logical block diagram of a disk array system depicting mapping of the disk drives in an array into one or more logical disk drives.

FIG. 2 shows a logical block diagram of a disk array system depicting mapping of the disk drives 106–107 in an array 210 into one or more logical disk drives 204–205. The array controller 208 maps the physical drives 106–107 into logical disks 204–205 such that a computer user 202 only "sees" the logical disks 204–205 rather than the physical drives 106–107. The number of physical drives 106–107, and the size of the physical drives 106–107 may be changed without affecting the number and size of the logical drives 204–205. Several physical drives 106–107 may be mapped into a single logical drive. Conversely, one of the physical drives 106–107 may be mapped into several logical drives. In addition to mapping physical drives 106–107 to logical drives 204–205, the array controller provides data striping of the data on the physical drives 106–107, and the array controller 208 corrects errors due to the failure of one or more of the physical drives 106–107. The mapping of the physical drives 106–107 to the logical drives 209 is provided by an array controller 208, which may be implemented in hardware, software, or both.

The array controller 208 maps data address on the physical drives 106-107 into logical address in the logical disks 204–205. Logical addresses are typically described in terms of logical blocks (e.g., chunks), numbered consecutively from 0 to N. Typically, the user 202 does not know how logical addresses map to physical addresses. Thus, for example, if the user 202 writes data to logical block 3, the user will not know which of the physical disks 106–107 actually receives the data. In order to balance I/O loads across the drives, the array controller will often map consecutive logical blocks across several physical drives, as shown in FIG. 3.

Figure 3:
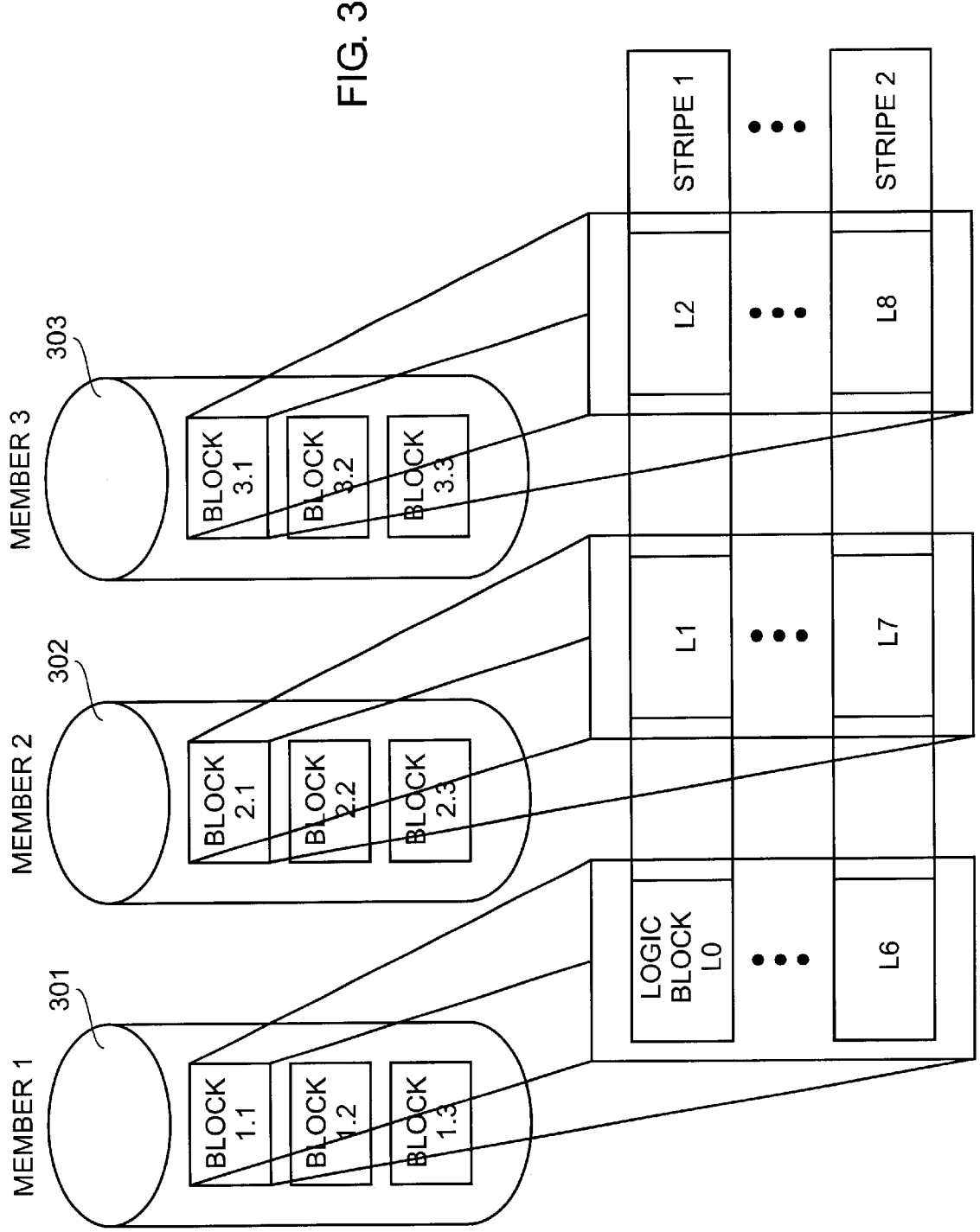
FIG. 3 shows an address mapping scheme known as disk striping, wherein physical address blocks having the same physical address but residing on different physical disk drives are mapped into units known as stripes.

FIG. 3 shows an address mapping scheme known as disk striping, wherein physical address blocks having the same physical address but residing on different physical disk drives are mapped into units known as stripes. For convenience, the present disclosure treats each chunk as having only one block, with the understanding that a stripe may contain multiple blocks. FIG. 3 shows three member drives 301–303 in a disk array. Each member drive has three physical disk blocks (a typical real-world disk drive would have tens of thousands of blocks). The physical blocks on member disk one 301 are labeled 1.1, 1.2, and 1.3. The physical blocks on member disk two 302 are labeled 2.1, 2.2, and 2.3. The physical blocks on member disk three 301 are labeled 3.1, 3.2, and 3.3.

In this configuration, a first stripe, stripe 1, includes physical blocks 1.1, 2.1, and 3.1. A third stripe, stripe 3, comprises physical blocks 1.3, 2.3, and 3.3. Logical blocks 0–2 are mapped into stripe 1 and logical blocks 6–8 are mapped into stripe 3.

In many instances, a user accessing data from the logical disks will access the logical disk blocks consecutively. The stripe mapping shown in FIG. 3 maps consecutive logical blocks across different disk drives. Thus a user accessing logical blocks in a consecutive fashion will see improved I/O performance because the disk operations will tend to be more uniformly distributed across all of the available disk drives.

The extent to which the array controller 208 can correct for multiple drive failures depends, in part, on the redundancy and/or parity (i.e., error correction) data stored on the physical drives 106–107. In a single dimension parity system such as RAID 3 and RAID 4, the array controller 208 can correct errors due to failure of one of the physical disks 106–107.

U.S. pat. application Ser. No. 09/250,657, which was been previously incorporated by reference, describes a parity arrangement whereby the array controller 208 can correct for failure of any two of the physical drives 106–107. As described therein, two-drive fault tolerance employs simple exclusive-or (XOR) parity processing and uses 2/N of the physical drive space for parity encoding. The two-drive XOR parity arrangement satisfies the following criteria: first, each chunk in the physical drives is a member of two different parity sets; second, different chunks have do not have common membership in both parity sets with another chunk; third, members of a parity set (including the parity unit) are spread across different physical drives; and fourth, data is available after failure of any two of the physical drives 106–107.

In one embodiment, parity data is provided in an N-by-N parity map within the array 210, where N is the number of physical drives, and the storage capacity is equal to N−2 drives. One parity set includes the chunks on a given row (row parity), while its complementary parity set is a column (column parity) drawn from N−2 different rows (and also N−2 different drives). The chunks are also distributed in such a manner that they can be striped. Preferably, N is a prime number greater than or equal to three such as three, five, seven, eleven, thirteen, seventeen, nineteen, etc.

Figure 4:
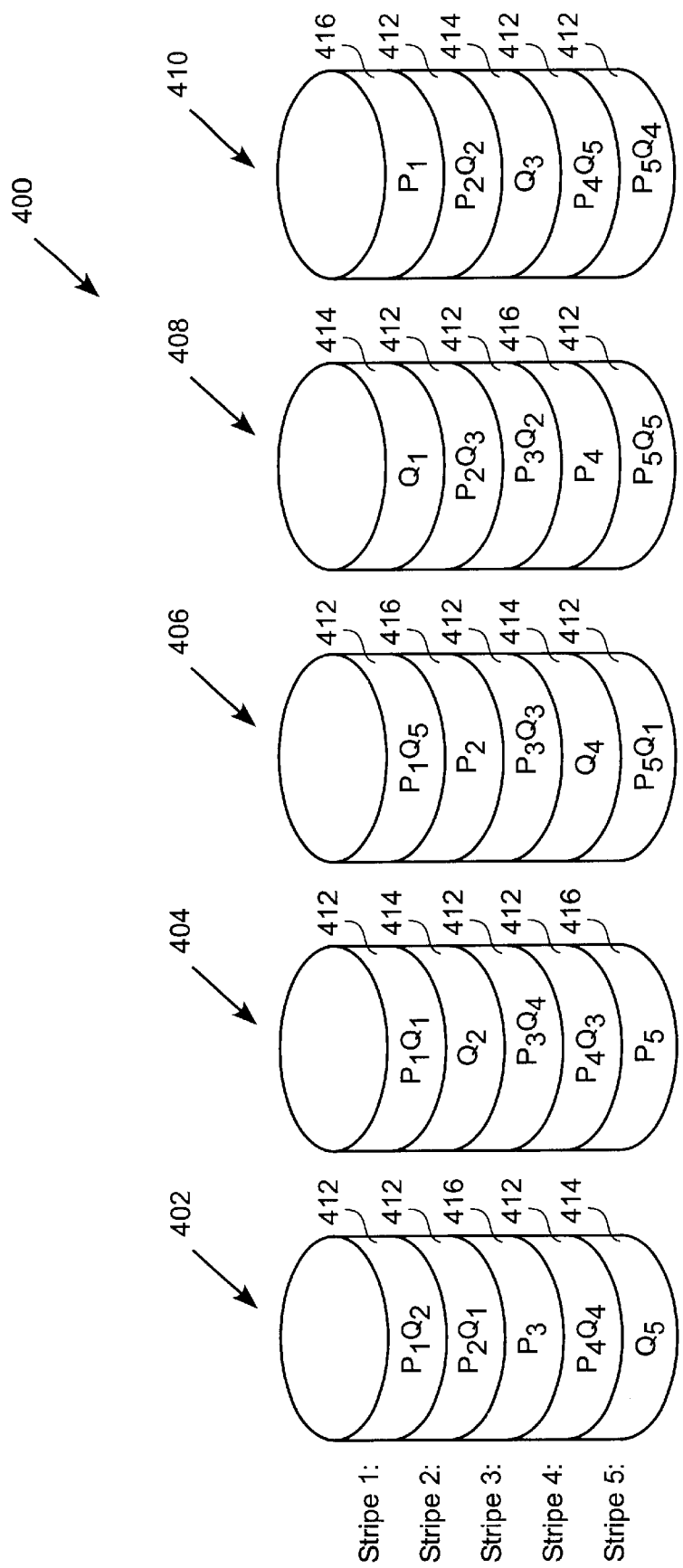
FIG. 4 illustrates an exemplary disk drive array configuration having five disk drives in accordance with one embodiment of the present invention.

In the preferred embodiment, the present invention assigns data chunks to a column parity set to implement an array configuration that requires minimum number of reconstruction in the event of a dual drive failure. FIG. 4 illustrates an exemplary a disk drive array configuration 400 having five (i.e., N=5) disk drives 402, 404, 406, 408, and 410 in accordance with one embodiment of the present invention. Each of the disk drives 402 to 410 corresponds to a column having five chunks such that the disk drive array is configured as one or more five-by-five RAID array configuration. The disk drives 402 to 410 are also organized row-wise as stripes. Stripes 1 to 5 correspond to rows and are defined over the disk drives 402 to 410.

Each of the chunks 412, 414, and 416 in the disk drive 402 represent the first physical drive for the associated stripes or rows. On the other hand, the first logical data chunks for each of the stripes 1 to 5 are the chunks immediately following a row parity chunk. For example, the first logical chunks for stripes 1 to 5 are $P_1Q_2$, $P_2Q_3$, $P_3Q_4$, $P_4Q_5$, and $P_5Q_1$, respectively. The remaining chunks are used as parity chunks for storing parity set. The method of assigning logical and parity chunks are well known in the art.

Each stripe and each column includes five data chunks. Of the five chunks, three data chunks 412 are used for storing user data while the remaining two parity chunks 414 and 416 are used for storing column and row parity sets. For example, chunks 412 that are labeled $P_iQ_j$ indicate data chunks $P_iQ_j$; chunks 416 labeled $P_i$ denote row parity set $P_i$; and chunks 416 labeled $Q_j$ indicate column parity set $Q_j$, where i and j range from 1 to the number of drives, i.e., 5. As used herein, a "chunk" refers to a block of data or parity and is used interchangeably with terms such as "striped unit," "block," and the like.

In this configuration, each of the column parity sets $Q_1$, to $Q_5$ in the column parity chunks are assigned data chunks for generating the column parity sets and, if necessary, for reconstructing original data in the event of a drive failure. Specifically, data chunks indicated as having label $Q_i$ are assigned to, or associated with, column parity set $Q_i$, or vice versa. For example, data chunks $P_2Q_1$, $P_1Q_l$, and $P_5Q_1$ are associated with column parity set $Q_1$. Likewise, data chunks $P_1Q_2$, $P_3Q_2$, and $P_2Q_2$ are associated with column parity set $Q_2$. Column parity sets Q3, Q4, and Q5 are assigned data chunks in a similar manner as shown. Each of the row parity sets $P_i$, on the other hand, is associated with (i.e., assigned) data chunks on the corresponding row.

With continuing reference to FIG. 4, the assignment of chunks follow a regular pattern. Within a row, the column parity set $Q_i$ is one less than the previous block and wraps around at zero. At the beginning of a row, the initial column parity set is one greater than the initial column parity set for the previous row and wraps around to one after the maximum parity set has been reached. The initial column parity set of the initial row is two, or one half the number of drives in the set rounded down.

The five-drive array configuration 400 having five stripes per drive (five-by-five) is also shown in a tabular form in Table 1 using a different labeling scheme.

TABLE 1

| | Column 1 | Column 2 | Column 3 | Column 4 | Column 5 |
|---|---|---|---|---|---|
| Stripe 1 | A2 | A1 | A5 | (1) | (A) |
| Stripe 2 | B1 | (2) | (B) | B3 | B2 |
| Stripe 3 | (C) | C4 | C3 | C2 | (3) |
| Stripe 4 | D4 | D3 | (4) | (D) | D5 |
| Stripe 5 | (5) | (E) | E1 | E5 | E4 |

In Table 1, the data chunks are shown in columns one through five without parenthesis and the parity chunks are shown in parentheses. The data and parity chunks are also shown in each of the five stripes in rows one through five. This five-by-five arrangement results in twenty-five block array including fifteen blocks of actual user data and ten blocks of parity data. Letters are used to denote the row parity for a data block and numbers are used to denote column parity for a data block. Each parity block is a member of only one parity set, either a row parity set or a column parity set. Each data block has a physical location (i.e., its physical location on a disk drive) and a logical position (its position in the two-dimensional parity arrangement). Each data block is a member of two parity sets, a row parity set and a column parity set. For example, a block A2 is a data block containing user data. Physically, the block A2 resides in the first chunk on the second drive. Logically, the block A2 is a member of the row parity set A, and is also a member of the column parity set 2.

When two drives fail, the array configuration 400 of FIG. 4 or Table 1 allows efficient reconstruction of the original data since the array configuration contains no circular dependencies. Dependencies, including circular dependency and interdependency, are well known in the art and are described in more detail in the previously referenced U.S. pat. application Ser. No. 09/250,657. The five-drive (five-by-five) parity configuration 400 only requires 2/3 reconstruction per chunk, and 5/3 reconstructions per failed chunk in a two-drive failure in the event of a two drive failure. This reconstruction scheme thus represents the most efficient reconstruction means in a five-drive array under RAID 6 mode implementing the dual-XOR scheme.

Figure 5:
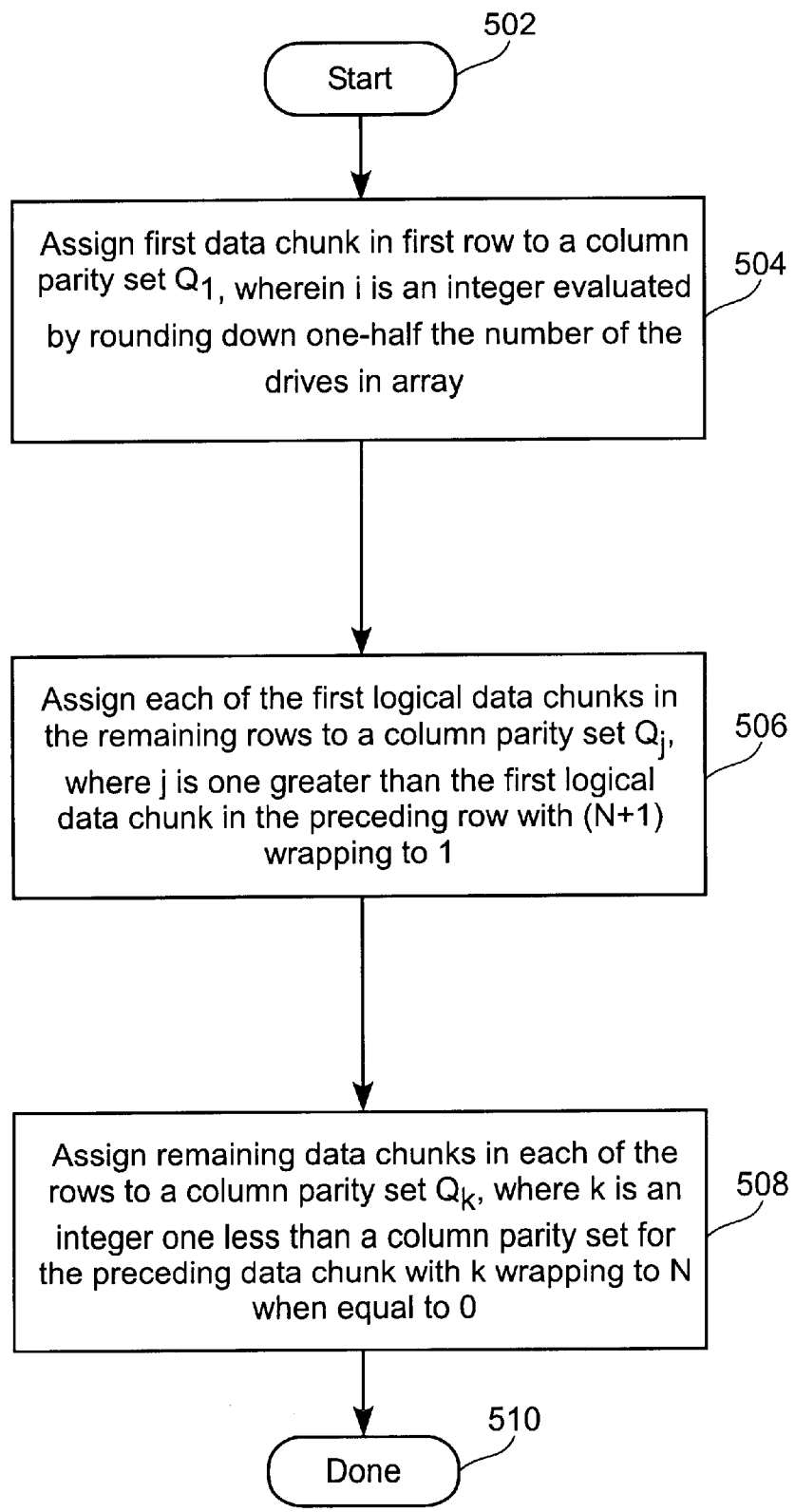
FIG. 5 illustrates a flowchart of an exemplary method for assigning column parity set $Q_i$ to data chunks in an N-by-N disk drive array in accordance with one embodiment of the present invention.

FIG. 5 illustrates a flowchart of an exemplary method for assigning column parity set $Q_i$ to data chunks in an N-by-N disk drive array in accordance with one embodiment of the present invention. The method begins in operation 502 and proceeds to operation 504, where the first data chunk in the first row is assigned to a column parity set $Q_i$, wherein index i is an integer evaluated by rounding down one-half the number of the drives (i.e., N/2) to an integer. For example, in the five-by-five array configuration 400 of FIG. 4, (N/2) rounded down yields 2 for N equal to five. Hence, the first data chunk 412 (i.e. $P_1Q_2$) of the first row is assigned to the column parity set $Q_2$.

Then, each of the first logical data chunks for the remaining rows 2 to five is assigned, in operation 506, to a column parity set Qj, where j is one greater than the first logical data chunk in the preceding row. When the index j reaches (N+1), it wraps around to 1. For instance, the first logical data chunk (labeled $P_2Q_3$) for row 2 of FIG. 4 is assigned to the column parity set $Q_3$ since the first logical data chunk for the preceding row 1 was assigned to the column parity set $Q_2$. In a similar manner, the first logical data chunks for rows 3, 4, and 5 are assigned to column parity sets $Q_4$, $Q_5$, and $Q_1$, respectively. It should be noted that the column parity set $Q_1$ for its first logical data chunk is determined by wrapping (N+1) or 6 to 1.

After assigning the first logical data chunks, each of the remaining data chunks in each of the rows is assigned, in operation 508, to column parity set $Q_k$, where k is an index that is one less than a column parity set for the preceding data chunk. The index k wraps to N when k equals zero. With reference to FIG. 4, for example, the last data chunk labeled $P_2Q_2$ in row 2 is assigned to the column parity set $Q_2$ since the column parity set for the preceding data chunk is $Q_3$. Other data chunks 412 in the array configuration 400 are assigned to a column parity set in a similar manner. The method then terminates in operation 510.

The column parity set assignment method of FIG. 5 may be applied to any suitable storage device systems having a prime number of drives greater than or equal to five. For example, a seven drive (N=7) configuration 600 illustrated in FIG. 6 can be generated using the method illustrated in FIG. 5. The seven-drive configuration 600 requires 2/3 reconstructions per chunk in a two-drive failure, and 7/3 reconstructions per failed chunk in a two-drive failure. FIG. 7 shows an eleven drive (N=11) configuration 700 while FIG. 8 illustrates a thirteen drive (N=13) configuration 800. The drive configurations 600, 700, and 800 use notation similar to the drive configuration described in Table 1.

The method of the present invention thereby reduces the assignment of column parity sets to an efficient and generalized scheme that can be used for any suitable RAID systems having a prime number of drives. In addition, the association of data parity sets with column parity sets in accordance with the present invention facilitates reconstruction of data in the event of dual-drive failures. This is because the resulting array configuration is free of circular rebuilding dependencies that can add unnecessary steps in reconstructing the original data.

The present invention, a method and system for assigning column parity sets to data chunks in a dual-fault tolerant RAID system, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for assigning data chunks to column parity sets in a dual-drive fault tolerant storage disk drive system having N disk drives, where N is a prime number, the method comprising the operations of:
   a) organizing each of the N disk drives into N chunks such that the N disk drives are configured as one or more N×N arrays, each of the arrays having chunks arranged in N rows from row 1 to row N and in N columns from column 1 to column N, each row including a plurality of data chunks for storing data and a column parity chunk for storing a column parity set, each row of the array further including a row parity chunk for storing a row parity set and wherein the data chunks in each row are assigned to the row parity set, each column parity set being associated with a set of data chunks in each of the arrays, wherein row m is associated with column parity set $Q_m$ where m is an integer that ranges from 1 to N;
   b) for row 1 of a selected N×N array,
      b1) assigning a first data chunk to a column parity set $Q_i$, wherein i is an integer determined by rounding down (N/2); and
      b2) for each of the remaining data chunks, assigning each data chunk to a column parity set $Q_j$, wherein j is an integer one less than a column parity set for the preceding data chunk and wherein j wraps to N when j is equal to 0; and
   c) for each of the remaining rows 2 to N of the selected array,
      c1) assigning a first logical data chunk to a column parity set $Q_k$, wherein k is one greater than the column parity set for the first logical data chunk in a preceding row and wherein k wraps to 1 when k is equal to (N+1); and
      c2) for each of the remaining data chunks, assigning each data chunk to a column parity set $Q_n$, wherein n is an integer one less than a column parity set for the preceding data chunk and wherein n wraps to N when n is equal to 0.

2. The method as recited in claim 1, wherein each of the rows defines a stripe and each of the columns defines a disk drive and wherein the first data chunk in row 1 is a first logical data chunk for row 1.

3. The method as recited in claim 2, wherein the operation of assigning the column parity set to the first data chunk for row 1 further comprises the operations of:
   determining the integer value by evaluating (N/2) rounded down; and
   associating the first chunk in the first row with the column parity set having the integer value.

4. The method as recited in claim 3, further comprising:
   generating each of the column parity sets for the array from the associated data chunks; and
   storing the generated column parity sets in the associated column parity chunks.

5. The method as recited in claim 4, further comprising:
   generating each of the row parity sets for the array from the associated data chunks; and
   storing the generated row parity sets in the associated column parity chunks.

6. The method as recited in claim 5, wherein the chunks are arranged into a plurality of XOR parity sets, each of the plurality XOR parity sets including a plurality of chunks as members, the plurality of XOR parity sets comprises a plurality of row parity sets and a plurality of column parity sets such that each chunk exists in a parity set pair, the parity set pair comprising a row parity set and a column parity set, and wherein no two chunks exist in the same parity set pair.

7. The method as recited in claim 1, wherein the storage disk drive system is a redundant array of independent disks (RAID) system.

8. The method as recited in claim 1, wherein N is greater than or equal to five.

9. A dual-fault tolerant storage system for assigning data chunks to parity sets, comprising:
   a disk array including N disk drives, each disk drive having N chunks such that the N disk drives are configured as an N×N array of chunks where N is a prime number, the chunks in the array being arranged in N rows from row 1 to row N and in N columns from column 1 to column N, each row including a plurality of data chunks for storing data and a column parity chunk for storing a column parity set, each row further including a row parity chunk for storing a row parity set and wherein the data chunks in each row are assigned to the row parity set, each column parity set being associated with a set of data chunks in the arrays, wherein row k is associated with column parity set $Q_k$ where k is an integer that ranges from 1 to N; and
   an array controller operatively coupled to the disk arrays, the array controller being configured to assign a first logical data chunk in row 1 to a column parity set $Q_i$, where i is an integer determined by rounding down (N/2), the array controller being further configured to assign a first logical data chunk in rows 2 to N to a column parity set $Q_j$, wherein j is an integer one greater than the column parity set for the preceding row and wraps to 1 when j is equal to (N+1), the array controller also being configured to assign each of the remaining data chunks to a column parity set $Q_m$, wherein m is an integer one less than a column parity set for the preceding data chunk and wherein m wraps to N when m is equal to 0.

10. The storage system as recited in claim 9, wherein each of the rows defines a stripe and each of the columns defines a disk drive.

11. The storage system as recited in claim 10, wherein the disk array generates each of the column and row parity sets for the array from the associated data chunks and stores the generated column and row parity sets in the associated column parity chunks.

12. The storage system as recited in claim 11, wherein the array controller arranges the chunks into a plurality of XOR parity sets, each of the plurality XOR parity sets including a plurality of chunks as members, the plurality of XOR parity sets comprising a plurality of row parity sets and a plurality of column parity sets such that each chunk exists in a parity set pair, the parity set pair comprising a row parity set and a column parity set, and wherein no two chunks exist in the same parity set pair.

13. The storage system as recited in claim 12, wherein the array controller is configured to recover data lost due to a failure of any two disk drives in the disk array.

14. The storage system as recited in claim 9, wherein the storage system is a redundant array of independent disks (RAID) system.

15. The storage system as recited in claim 9, wherein N is greater than or equal to five.

16. A method for assigning data chunks to column parity sets in a dual-drive fault tolerant storage redundant array of independent disks (RAID) system having N disk drives, wherein N is a prime number, the method comprising the operations of:

a) organizing the N disk drives into one or more N×N arrays, each of the arrays having chunks arranged in N rows from row 1 to row N and in N columns from column 1 to column N, each row including a plurality of data chunks for storing data, each row further including a row parity chunk and a column parity chunk for storing a row parity set and a column parity set, respectively, the data chunks in each row being assigned to the associated row parity set, each column parity set being associated with a set of data chunks, wherein row m is associated with column parity set $Q_m$ where m is an integer that ranges from 1 to N;

b) for each row 1 of each of the N×N arrays,
  b1) assigning a first logical data chunk to a column parity set $Q_i$, wherein i is an integer determined by rounding down (N/2); and
  b2) for each of the remaining data chunks, assigning each data chunk to a column parity set $Q_j$, wherein j is an integer one less than a column parity set for the preceding data chunk and wherein j wraps to N when j is equal to 0; and c) for each of the remaining rows 2 to N of each of the N×N arrays,
  c1) assigning a first logical data chunk to a column parity set $Q_k$, wherein k is one greater than the column parity set for the first logical data chunk in the preceding row and wherein k wraps to 1 when k is equal to (N+1); and
  c2) for each of the remaining data chunks, assigning each data chunk to a column parity set $Q_n$, wherein n is an integer one less than a column parity set for the preceding data chunk and wherein n wraps to N when n is equal to 0.

17. The method as recited in claim 16, wherein each of the rows defines a stripe and each of the columns defines a disk drive.

18. The method as recited in claim 16, further comprising:
  generating each of the column and row parity sets for the array from the associated data chunks; and
  storing the generated column and row parity sets in the associated column parity chunks.

19. The method as recited in claim 18, wherein the chunks are arranged into a plurality of XOR parity sets, each of the plurality XOR parity sets including a plurality of chunks as members, the plurality of XOR parity sets comprises a plurality of row parity sets and a plurality of column parity sets such that each chunk exists in a parity set pair, the parity set pair comprising a row parity set and a column parity set, and wherein no two chunks exist in the same parity set pair.

20. The method as recited in claim 16, wherein N is greater than or equal to five.

* * * * *